United States Patent [19]
Takeda et al.

[11] 4,172,180
[45] Oct. 23, 1979

[54] HEAT SENSITIVE COLOR FORMING AND HEAT SENSITIVE ELECTRICAL CONDUCTIVITY INCREASING COMPOSITION AND HEAT SENSITIVE IMAGE RECORDING SHEET USING THE SAME

[75] Inventors: Keiji Takeda; Masayoshi Nagata; Kenji Matsumoto, all of Minami-ashigara, Japan

[73] Assignee: Fuji Photo Film Co., Ltd., Minami-ashigara, Japan

[21] Appl. No.: 878,357

[22] Filed: Feb. 16, 1978

[30] Foreign Application Priority Data

Feb. 17, 1977 [JP] Japan ................... 52-16369

[51] Int. Cl.$^2$ ............................................. H01B 1/00
[52] U.S. Cl. .................................... 428/522; 252/500; 428/279; 428/290; 428/411; 428/412; 428/426; 428/442; 428/463; 428/473; 428/483; 428/476; 428/510; 428/514; 428/904; 428/913

[58] Field of Search .................. 252/500; 428/913; 427/148; 96/48 HD, 114.1, 115 R

[56] References Cited

U.S. PATENT DOCUMENTS

| | | | |
|---|---|---|---|
| 2,712,996 | 7/1955 | Elliott | 96/115 R X |
| 2,754,210 | 7/1956 | Elliott | 96/115 R X |
| 3,155,513 | 11/1964 | Sorensen | 96/115 R X |
| 4,032,691 | 6/1977 | Kido et al. | 428/913 X |

*Primary Examiner*—Benjamin R. Padgett
*Assistant Examiner*—E. Suzanne Parr
*Attorney, Agent, or Firm*—Sughrue, Rothwell, Mion, Zinn and Macpeak

[57] ABSTRACT

A heat sensitive color forming and heat sensitive electrical conductivity increasing composition comprising a mixture of (A) a basic polymer which reacts with hydrogen halide and is capable of forming a quaternary salt and (B) a halogen-containing polymer capable of forming a conjugated polyene by the elimination of hydrogen halide; and a heat sensitive image recording sheet containing the same.

13 Claims, No Drawings

HEAT SENSITIVE COLOR FORMING AND HEAT SENSITIVE ELECTRICAL CONDUCTIVITY INCREASING COMPOSITION AND HEAT SENSITIVE IMAGE RECORDING SHEET USING THE SAME

BACKGROUND OF THE INVENTION

1. Field of the Invention

The present invention is directed to a novel composition which forms color and is rendered electrically conductive on heating, and to a heat sensitive image recording sheet using the same.

2. Description of the Prior Art

A variety of heat sensitive recording elements are known and described in detail, for example, in Jaromir Kosar, *Light Sensitive Systems*, Chapter 9, John Wiley & Sons (1965), Masanobu Wada, *Insha Kogaku II*, Chapter 5, Kyoritsu Shuppan Co., Ltd., Tokyo (1969), etc. These conventional heat sensitive recording elements are broadly classified as follows. In one group the element contains a recording layer which undergoes a physical change due to the action of heat to thereby form images. The element uses, for example, a substance which melts on heating and becomes transparent, or a colored substance which sublimes on heating and is thereby transferred into an image receiving layer, or the like. In another group the recording element is one in which a chemical reaction is induced on a recording layer by the action of heat, and as a result, colored visible images are formed.

A heat sensitive recording element which belongs to this group includes, firstly, an element in which two or more reactive components are present in but separated in the recording layer so that they do not react with each other at room temperature and, by heating, they are brought into contact and reacted to thereby form a colored material. As reactive components, combinations of metal compounds such as fatty acid metal salts, etc., and reducing agents or chelate-forming agents, which produce colored images comprising reduced metal or metal chelate compounds due to heating, and further, combinations of dye precursors such as leuco dyes and reducing agents which produce dye images due to heating are used. Secondly, an element which forms colored substances directly or indirectly on thermal decomposition thereof are present. For example, a combination of a compound which releases an alkaline substance due to the thermal decomposition thereof, a pH indicator or a diazonium salt and a coupler; a combination of phenols and nitroso compounds, etc.; are known. In each case, the thermal decomposition products react with a second substance to produce a colored image.

Various disadvantages are encountered with these chemical methods since all utilize relatively unstable low molecular weight organic compounds or metal compounds as the image forming components. For this reason, the recording elements are generally unstable at room temperature and in addition, many of these substances are toxic or expensive. Further, the images formed are unstable to light or heat where the images are dye images. Furthermore, dye images and metal chelate images do not provide a sufficiently high image density. Also, in a recording element comprising two or more kinds of color forming components, it is necessary for these components to be separated so that they do not react with each other at room temperature and as a result most of the recording layers are generally opaque per se.

It is known that the splitting off of hydrogen chloride from halogen-containing polymers (for example, polymers of vinyl chloride or vinylidene chloride) is induced due to the action of light or heat and as a result polyenes are formed to thereby form a color. Many investigations of these reactions have been made mainly from the viewpoint of stabilizing halogen-containing polymers and the results of recent investigations are reported, for example, in G. Ayrey, B. C. Head and R. C. Poller, "Macromolecular Reviews," *J. Polymer Sci.*, vol. 8, page 1 (1974).

Further, light image recording elements which utilize that property that a color is formed due to the lack of stability of halogen-containing polymers, particularly due to conversion into polyenes have been proposed in Japanese Patent Publications Nos. 10647/75 and 35451/74, U.S. Pat. Nos. 3,615,456, 2,772,159, 3,046,136, 2,712,996 and 2,754,210, and S. B. Elliot, *Photographic Eng.*, vol. 4, page 133 (1953). All of these elements involve a system in which a substance which, by the action of light, accelerates the hydrogen halide splitting off reaction of the halogen-containing polymers is added and polyene images are formed only by exposure or by heating subsequent to exposure.

Furthermore, heat sensitive image recording elements utilizing the above-described property of halogen-containing polymers have been proposed in U.S. Pat. Nos. 2,855,266 and 3,155,513. In these systems, metal compounds are added to the halogen-containing polymers as a hydrogen halide splitting off accelerator. These heat sensitive elements have the disadvantage that the recording layer thereof is opaque since particles of metal compounds (for example, metal oxides) are added.

On the other hand, it is reported, for example, in H. Wechster, *J. Polymer Science*, vol. 11, page 233 (1953) and L. A. Matheson and R. F. Boyer, *Ind. Eng. Chem.*, vol. 44, page 867 (1952) that halogen-containing polymers react in solution with bases such as pyridine or morpholine and polyenes are formed. A method for preparing ion exchange resins utilizing this reaction has been proposed in British Pat. No. 697,503. However, these methods are all directed to solution reactions, which are not appropriate for heat sensitive recording elements.

SUMMARY OF THE INVENTION

During studies and investigations on image recording processes utilizing polyene forming reactions of halogen-containing polymers by the elimination of hydrogen halide therefrom, it has now been found that a solid mixture of a certain kind of halogen-containing polymers and a polymer having therein a certain king of basic groups as a repeating unit (hereafter simply referred to as "basic polymer") forms a brown to black color on heating. Neither the halogen-containing polymer alone nor the basic polymer alone formed a color on heating at the same temperature for the same period of time. It was further found that the above described solid mixture of the two kinds of polymers was electrically insulative at normal temperature (below 100° C.), but became electrically conductive on heating, while each of the polymers individually was still electrically insulative even after heating at the same temperature for the same period of time.

The present invention has been accomplished based upon the discovery of the above-described phenomenon.

An object of the present invention is to provide a heat sensitive composition in which a color is formed on heating (hereinafter "heat sensitive color forming") and in which electrical conductivity is increased (hereinafter "heat sensitive electrical conductivity increasing") and a heat sensitive image recording sheet using the same which are novel, have excellent transparency, storage stability and image stability, are non-toxic and safe, and can be prepared in a simple manner using inexpensive starting materials.

Viewing the present invention from another standpoint, an object of the present invention is to improve the polyene-forming reaction of a halogen-containing polymer by elimination of hydrogen halide and to provide a novel utilization of this reaction.

That is, the present invention, provides, in one embodiment, a heat sensitive color forming and heat sensitive electrical conductivity increasing composition which comprises a mixture of (A) a basic polymer capable of forming a quaternary salt by reaction of the basic polymer with hydrogen halide, and (B) a halogen-containing polymer capable of forming a conjugated polyene by elimination of hydrogen halide.

In another embodiment, the present invention provides a heat sensitive image recording sheet comprising a support having thereon a layer comprising a mixture of (A) a basic polymer capable of forming a quaternary salt by the reaction of the basic polymer with hydrogen halide, and (B) a halogen-containing polymer capable of forming a conjugated polyene by elimination of hydrogen haldie.

DETAILED DESCRIPTION OF THE INVENTION

The term "a basic polymer capable of forming a quaternary salt by reaction of the basic polymer with hydrogen halide" as component (A) is used herein to define the polymers as indicated below. That is, such a polymer is a polymer obtained generally by polymerizing one or more addition polymerizable monomers containing a nitrogen-containing heterocyclic group or an aminophenyl group capable of being quaternized by reacting with hydrogen halide (hereafter referred to as "basic monomer") or by copolymerizing one or more of such addition polymerizable monomers with one or more other addition polymerizable monomers, and therefore is a polymer having a number of basic groups as repeating units. Preferred examples of nitrogen-containing heterocyclic groups which can be present in the basic polymer include a pyridyl group, a quinolyl group, a piperidyl group, an imidazolyl group and a pyrimidyl group. These nitrogen-containing heterocyclic groups are bonded, through an atom other than the nitrogen atoms of the nitrogen-containing heterocyclic group, to a carbon atom in the main-chain of the polymer. Further, the nitrogen-containing heterocyclic group may be substituted at positions other than the nitrogen atom or an atom through which the group is bonded to a carbon atom in the main-chain of the polymer by a straight-chain or branched chain alkyl group having 1 to 7 carbon atoms (e.g., a methyl group, an ethyl group, a propyl group, etc.). The aminophenyl group may also be substituted with a straight-chain or branched chain alkyl group having 1 to 7 carbon atoms (e.g., a methyl group, an ethyl group, a propyl group, etc.). Typical examples of such basic monomers include vinylpyridines (4-, 3- and 2-vinylpyridines and the derivatives thereof), vinylquinolines(for example, 2-vinylquinoline, 4-vinylquinoline, 6-chloro-2-vinylquinoline, etc.), vinylpiperidines(for example, 2-vinylpiperidine, 3-vinylpiperidine, 1-ethyl-2-vinylpiperidine, 1-ethyl-3-vinylpiperidine, etc.), vinylimidazoles (for example, 2-vinylimidazole, 1-methyl-2-vinylimidazole, 2-vinylbenzimidazole, etc.), aminostyrenes (for example, o-, m- and p-aminostyrenes, p-N,N-dimethylaminostyrene, etc.), vinylpyrimidines (for example, 4-vinylpyrimidine, 2-dimethylamino-4-vinylpyrimidine, etc.), and the like.

Preferred basic monomers are 4-vinylpyridine, 3-vinylpyridine and the substituted derivatives thereof represented by the general formula (I) or (II) shown below:

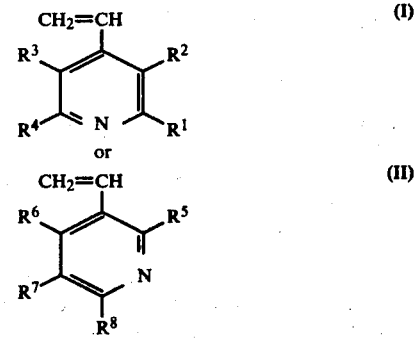

wherein $R^1$, $R^2$, $R^3$, $R^4$, $R^5$, $R^6$, $R^7$ and $R^8$, which may be the same or different, each represents a hydrogen atom, or a straight chain or branched alkyl group having 1 to 7 carbon atoms, (for example, a methyl gorup, an ethyl group, an n-propyl group, an isopropyl group, an n-butyl group, an n-heptyl group, etc.) $R^1$, $R^4$, $R^5$ and $R^8$ are preferably a hydrogen atom or those groups having less steric hindrance to the quaternization of the nitrogen atom by reaction with hydrogen halide and, examples include a methyl group, an ethyl group, an n-propyl group, an isopropyl group, an n-butyl group, and the like. These monomers are preferred in the present invention since homopolymers or copolymers derived from these monomer are particularly effective in color formation and electrical conductivity increase upon heating when such homopolymers or copolymers are mixed with a halogen-containing polymer (B). Specific examples of such vinylpyridines monomers are, for example, 4-vinylpyridine, 3-vinylpyridine, 2-methyl-4-vinylpyridine, 2-ethyl-4-vinylpyridine, 3-methyl-4-vinylpyridine, 3-isopropyl-4-vinylpyridine, 2-methyl-5-vinylpyridine, 2-ethyl-5-vinylpyridine, 3-methyl-5-vinylpyridine, 3-n-butyl-5-vinylpyridine, etc.

The basic polymer (A) can be a homopolymer of one of the above described basic monomers or can be a copolymer of two or more of the above described basic monomers (in this case, the copolymerization ratio is not limited). The basic polymer (A) can also be a copolymer of one or more of the above-described basic monomers with one or more addition polymerizable monomers copolymerizable therewith. In this case, it is preferred for the molar fraction of the basic monomer unit, which is defined as the proportion of the basic monomer units to the total monomer units present in the copolymer, in the copolymer obtained by copolymerization with these other addition polymerizable monomers to be about 0.3 or greater. This is a condition determined by the content of the basic group necessary for the composition and sheet of the present invention to exhibit a sufficient color formation and increase in electrical conductivity on heating. The higher the molar fraction of the basic monomer unit, the more marked is the color formation and increase in electrical conductivity in general.

Typical examples of other addition polymerizable monomers which are copolymerizable with the above-described basic monomers include the following compounds: monoolefinic compounds such as ethylene, propylene, butene, cyclopentylethylene, cyclohexylethylene, etc.; diene compounds such as butadiene, isoprene, chloroprene, methoxybutadiene, cyclopentadiene, 1,3-cyclohexadiene, etc.; halogenated vinyl compounds such as vinyl chloride, vinyl bromide, etc.; vinyl ether compounds such as vinyl methyl ether, vinyl ethyl ether, vinyl n-propyl ether, vinyl isopropyl ether, vinyl n-butyl ether, vinyl isobutyl ether, vinyl tert-butyl ether, vinyl neopentyl ether, vinyl 2-methoxyethyl ether, vinyl 2-chloroethyl ether, vinyl 2,2,2-trifuloroethyl ether, vinyl benzyl ether, etc.; styrene compounds such as styrene, α-methylstyrene, 4-chlorostyrene, dichlorostyrene, 2,5-dimethoxystyrene, 4-methylstyrene, 4-ethylstyrene, etc.; aromatic vinyl compounds other than styrene compounds such as 4-vinylbiphenyl, 9-vinylanthracene, acenaphthylene, indene, etc.; N-heterovinyl compounds other than the basic monomers described above such as N-vinylcarbazole, N-vinylpyrrolidone, N-vinylpyridine, etc.; acrylic acid compounds such as acrylic acid, methacrylic acid, etc.; acrylic acid ester compounds such as methyl acrylate, ethyl acrylate, butyl acrylate, etc.; methacrylic acid ester compounds such as methyl methacrylate, ethyl methacrylate, n-propyl methacrylate, n-butyl methacrylate, isobutyl methacrylate, n-hexyl methacrylate, 2-ethylbutyl methacrylate, n-lauryl methacrylate, 4-(tert-butyl)phenyl methacrylate, bornyl methacrylate, etc.; acrylonitrile compounds such as acrylonitrile, methacrylonitrile, etc.; acrylamide compounds such as acrylamide, N,N-dimethylacrylamide, N-(1,1-dimethyl-3-oxobutyl)acrylamide, and methacrylamide; vinyl methyl ketone; methyl isopropenyl ketone; 1-nitropropylene; vinylsulfonic acid; maleic anhydride; allyl alcohol; vinyl ester compounds such as vinyl acetate, vinyl chloroacetate, vinyl n-butyrate, vinyl isobutyrate, vinyl pivalate, vinyl caprate, vinyl laurate, vinyl benzoate, vinyl sulfate, etc., and the like.

Further, the basic polymer (A) can also be a copolymer obtained by hydrolysis or treatment with an aldehyde of at least a part of the vinyl ester units in the copolymer of the basic monomers and the vinyl ester compounds described above (that is, copolymers containing the basic monomer unit in the main chain of polyvinyl aldal compounds such as polyvinyl alcohol, polyvinyl formal, polyvinyl acetal, polyvinyl butyral, polyvinyl isobutyral, etc.).

Of the basic polymers (A) described above, poly-4-vinylpyridine and poly-3-vinylpyridine are particularly effective in the present invention. In other words, mixtures thereof with these halogen-containing polymers (B) provide the most remarkable speed and degree of color formation and increase of electric conductivity on heating.

Upon investigation it was found that the effectiveness of the basic polymer (A) in the present invention as described above (that is, the effectiveness in speed and degree of color formation and increase in electrical conductivity on heating the mixture thereof with the halogen-containing polymer (B) is substantially independent of the molecular weight of the basic polymer (A). Therefore, the range of the molecular weight of both homopolymers and copolymers of the basic polymer (A) is not particularly limited, but it is generally preferred for the average molecular weight of the basic polymer (A) to range from about 10,000 to about 1,000,000, considering film forming capability, stability against phase separation of the mixture thereof with the halogen-containing polymer (B), as well as ease in synthesis of the polymeric materials.

While not desiring to be bound it is believed that the basic polymer (A) described above functions as a trap for hydrogen halide in that the basic groups of the basic polymer (A) react with the hydrogen halide split off from the halogen-containing polymer (B) to form a quaternary salt, and therefore, the formation of polyenes by the elimination of hydrogen halide from the halogen-containing polymer (B) is accelerated. Further, it is also believed that the basic group (or quaternary salt thereof) further reacts with the polyenes to thereby contribute to the formation of dyes, as will be discussed hereafter.

The term "halogen-containing polymer capable of forming polyenes by elimination of hydrogen halide" used as component (B) in accordance with the present invention is a polymer having halogen atoms in the main chain thereof. More specifically such is a polymer generally obtained by polymerizing one or more addition polymerizable monomers in which at least one halogen atom is substituted for a hydrogen atom bonded to the carbon atoms forming ethylenic unsaturated bonds (hereafter referred to as halogenated monoolefins) or copolymerizing one or more such monomers with one or more other addition polymerizable monomers. Examples of suitable halogenated monoolefin monomers include halogenated vinylidenes such as vinylidene chloride, vinylidene bromide, vinylidene fluoride, 1-chloro-1-bromoethylene, 1-chloro-1-fluoroethylene, 1-bromo-1-fluoroethylene, etc.; halogenated vinyls such as vinyl chloride, vinyl bromide, vinyl fluoride, etc.; halogenated propenes such as 2-chloropropene, 1-chloropropene, 2-fluoropropene, etc., and the like.

Of these halogenated monoolefins, homopolymers or copolymers of vinylidene chloride and vinylidene bromide are particularly effective in the present invention. More specifically, where the homopolymers or copolymers of these monomers are mixed with the basic polymer (A) and the mixture is heated, the speed as well as degree of color formation and increase in electrical conductivity are particularly remarkable.

The halogen-containing polymer (B) can be a homopolymer of one of the halogenated monomers described above or a copolymer of two or more of the halogenated monoolefins described above (in which case the copolymerization ratio is not limited). The halogen-containing polymer (B) can also be a copolymer of one or more of the halogenated monoolefins described above with one or more other addition polymerization monomers which are not halogenated monoolefins as described above. In this case, it is preferred for the molar fraction of the halogenated monoolefin unit, which is defined as the proportion of the halogenated monoolefin units to the total monomer units, in the copolymers which are obtained by copolymerization with these other monomers to be about 0.3 or more. If the molar fraction of the halogenated monoolefin unit is about 0.3 or more, a polyene of conjugated double bonds having a length sufficient to absorb visible light can be formed in the copolymer since a sufficient amount of portions bonding the halogenated monoolefin units themselves (so-called "block") is present. It is difficult to absolutely determine the length of the conjugated double bond of the polyenes described above since the nature of the polyenes is not exactly known. In addition, since the number of the halogenated monoolefin units in a block in the copolymers depends upon the reactive ratio in the copolymerization of the monomers used in the combination of monomers copolymerized, the sequence is not primarily determined only from the molar fraction alone of the halogenated monoolefin units in the copolymer. However, in general, the higher the molar fraction of the halogenated monoolefin units, the longer is the sequence of the halogenated monoolefin units and the greater is the fraction of the polymer chain having the sequence of above a definite value. Therefore, it is sufficient for the purposes of the present invention if the molar fraction of the halogenated monoolefin units is about 0.3 or greater.

Specific examples of other addition polymerizable monomers which are copolymerizable with the halogenated monoolefins described above include the following compounds: monoolefin compounds such as ethylene, propylene, butene, pentene, cyclopentylethylene, cyclohexylethylene, etc.; diene compounds such as butadiene, isoprene, chloroprene, methoxybutadiene, 1,3-cyclohexadiene, cyclopentadiene, etc.; vinyl ether compounds such as vinyl methyl ether, vinyl ethyl ether, vinyl n-propyl ether, vinyl isopropyl ether, vinyl n-butyl ether, vinyl isobutyl ether, vinyl tert-butyl ether, vinyl neopentyl ether, vinyl 2-methoxyethyl ether, vinyl 2-chloroethyl ether, vinyl 2,2,2-trifluoroethyl ether, vinyl dibenzyl ether, etc.; styrene compounds such as styrene, α-methylstyrene, 4-chlorostyrene, dichlorostyrene, 2,5-dimethoxystyrene, 4-methylstyrene, 4-ethylstyrene, p-vinylbenzyl propyl ether, etc.; aromatic vinyl compounds other than styrene type compounds such as 4-vinyl-biphenyl, 9-vinylanthracene, acenaphthylene, indene, etc.; N-heterovinyl compounds other than basic monomers which form component (A) such as N-vinylcarbazole, N-vinylpyrrolidone, N-vinylpyridine, etc.; acrylic acid compounds such as acrylic acid, methacrylic acid, etc.; acrylic acid ester compounds such as methyl acrylate, ethyl acrylate, butyl acrylate, etc.; methacrylic acid ester compounds such as methyl methacrylate, ethyl methacrylate, n-propyl methacrylate, n-butyl methacrylate, isobutyl methacrylate, n-hexyl methacrylate, 2-ethylbutyl methacrylate, n-lauryl methacrylate, 4-(tert-butyl)phenyl methacrylate, bornyl methacrylate, etc.; acrylonitrile compounds such as acrylonitrile, methacrylonitrile, etc.; acrylamide compounds such as acrylamide, N,N-dimethylacrylamide, N-(1,1-dimethyl-3-oxobutyl) acrylamide, etc.; and methacrylamide; vinylmethyl ethyl ketone; methyl isopropenyl ketone; 1-nitropropylene; vinylsulfonic acid; maleic anhydride; allyl alcohol; vinyl ester compounds such as vinyl acetate, vinyl chloroacetate, vinyl n-butyrate, vinyl isobutyrate, vinyl pivalate, vinyl caprate, vinyl laurate, vinyl benzoate, vinyl sulfate, etc.; and the like.

Further, the halogen-containing polymer (B) can be a copolymer obtained by hydrolyzing or treating with an aldehyde at least a part of the vinyl ester unit in the copolymers of halogenated monoolefin monomers and the above described vinyl ester compounds (that is, copolymers containing the halogenated monoolefin monomer unit in the main chain of the polyvinyl aldal compounds such as polyvinyl alcohol, polyvinyl formal, polyvinyl acetal, polyvinyl butyral, polyvinyl isobutyral, etc.).

In addition to homopolymers or copolymers obtained from these monomers described above, chlorinated polymers obtained by chlorination (e.g., to an extent of about 50 wt% or more) of polymers which do not contain any chlorine, e.g., chlorinated polyethylene (in which the chlorine content is about 50 wt% or more), chlorinated polypropylene (in which the chlorine content is about 50 wt% or more), chlorinated rubbers (in which the chlorine content is about 50 wt% or more), etc., can also be employed as the halogen-containing polymer (B) in the present invention.

Of the halogen-containing polymer (B) described above, copolymers of vinylidene chloride and acrylonitrile are particularly effective in the present invention, with the molar fraction of the vinylidene chloride unit being in the range of from about 0.35 to about 0.95. The reasons are because these copolymers exhibit the most remarkable color formation and a remarkable increase in electrical conductivity where these copolymers are mixed with the high molecular weight base (A) and the mixture is heated. When the molar fraction of the vinylidene chloride unit is less than about 0.35, the speed and degree of color formation and increase in electric conductivity by heating are poor. On the other hand, when the molar fraction of the vinylidene chloride unit is greater than 0.95, solubility in solvents is poor so that it is difficult to prepare the composition and sheet of the present invention.

The effectiveness of the halogen-containing polymer (B) in the present invention does not depend to a great extent upon the molecular weight thereof. In general, a suitable average molecular weight of the halogen-containing polymer (B) ranges from about 10,000 to about 1,000,000, considering the film forming capability and stability against phase separation of mixtures with the basic polymer (A), as well as ease in synthesis of the polymers.

Where the basic polymer (A) and/or the halogen-containing polymer (B) are copolymers, not only binary copolymers thereof, but ternary copolymers thereof, block copolymers thereof and graft copolymers thereof are also suitable.

Methods for synthesizing the above-described polymers which can employed in producing these polymers used in the present invention are well known (and are described in, for example, T. Tamikado, *J. Polymer Sci.*, 43, 489 (19609). Examples of the syntheses of these polymers are described below. Unless otherwise indicated, all parts, percents, ratios and the like are by weight.

SYNTHESIS EXAMPLE 1

Synthesis of Poly(4-vinylpyridine)

In a 300 ml three necked flask were changed 40 g of purified 4-vinylpyridine, 150 ml of N,N-dimethylformamide purified under a nitrogen atmosphere and 0.1 g of azobisisobutyronitrile. The mixture was polymerized for 8 hrs at 70° C. under a nitrogen atmosphere. The reaction liquid was gradually added to a large amount of toluene so that polymer was precipitated. After filtering and drying, the polymer was dissolved again in N,N-dimethylformamide. The solution was dropwise added to a large amount of toluene, followed by filtering and drying. The so obtained powder was white and the yield was 47%. The average molecular weight was 60,000.

SYNTHESIS EXAMPLE 2

Synthesis of Poly(4-vinylpyridine-styrene) Copolymer

In a 200 ml three necked flask were charged 21 g of 4-vinylpyridine, 21 g of styrene and 0.1 g of azobisisobutyronitrile and 90 ml of benzene. The mixture was polymerized at 80° C. for 6 hrs under a nitrogen atmosphere. The reaction liquid was poured into a large amount of n-hexane to thereby obtain white precipitates. After filtering and drying, a white powder was obtained. The molar fraction of vinylpyridine in the polymer was 0.57 and the yield was 20%.

SYNTHESIS EXAMPLE 3

Synthesis of Poly(vinylidene chloride-styrene) Copolymer

In a 300 ml three necked flask were charged 150 ml of distilled water which was sufficiently purged with nitrogen gas, and 0.75 g of sodium lauryl sulfonate. Under a nitrogen atmosphere, a 1/10 amount of a mixture of vinylidene chloride (30 g), styrene (20 g) and benzene (trace) was poured thereinto. The mixture was kept on a warm water bath maintained at 30° C. and stirring of the mixture was continued for 20 mins. Thereafter, 10 ml of an aqueous solution containing 0.75 g of potassium persulfate and 10 ml of an aqueous solution containing 0.75 g of sodium bisulfite were added to the mixture, in several portions. The monomer mixture was also added dropwise. The reaction was completed in three hours. The reaction liquid was salted out with an aqueous sodium chloride solution and then the precipitates were dissolved in methyl ethyl ketone. The solution was poured into methyl alcohol. After filtering and drying, a white powder was obtained. The molar fraction of vinylidene chloride in the polymer was 0.44 and the yield was 10%.

SYNTHESIS EXAMPLE 4

Synthesis of Poly(vinylidene chloride-acrylonitrile) Copolymer

Into a 300 ml three necked flask were charged 150 ml of distilled water which was sufficiently purged with nitrogen gas, and 0.75 g of sodium lauryl sulfonate. Under a nitrogen atmosphere, a 1/10 amount of a mixture of vinylidene chloride (20 g), acrylonitrile (10 g) and benzene (trace) was poured thereinto. The mixture was kept in a warm water bath maintained at 30° C. After stirring the mixture for 20 mins. 10 ml of an aqueous solution containing 0.75 g of potassium persulfate and 10 ml of an aqueous solution containing 0.75 g of sodium bisulfite were portionwise added to the mixture. The monomer mixture solution was also dropwise added thereto. The reaction was completed in 3 hrs. After the reaction liquid was salted out with an aqueous sodium chloride solution, the precipitates were dissolved in N,N-dimethylformamide. The solution was poured into methyl alcohol. After filtering and drying, a white powder was obtained. The molar fraction of vinylidene chloride in the polymer was 0.78 and the yield was 15%.

Other homopolymers and copolymers can be easily synthesized following the methods described above.

The heat sensitive color forming and heat sensitive electrically conductivity increasing composition of the present invention can be prepared by mixing the basic polymer (A) and the halogen-containing polymer (B) described above, which is generally achieved by dissolving components (A) and (B) in a solvent common thereto, stirring and mixing, and then evaporating the solvent off to obtain a solid mixture of components (A) and (B).

In addition, the highly sensitive image recording sheet of the present invention can be prepared by coating a solution of the components (A) and (B) described above onto a support followed by drying.

A suitable mixing weight ratio of the basic polymer (A) and the halogen-containing polymer (B) is in the range of from about 8:1 to about 1:5, preferably 4:1 to 1:2, with an optimum weight ratio being about 1:1. In this range, the speed or degree of color formation and increase in electric conductivity on heating is sufficiently large and therefore, suitable for the purposes of the present invention. However, the change in speed or degree of color formation and increase in electric conductivity due to change in the (A):(B) ratio described above is not drastic, and, even if the weight ratio of (A):(B) is outside the range described above, a definite (although the degree depends upon heating temperature and heating time) color formation and increase in electric conductivity are exhibited. Accordingly, depending upon the purposes of use of the composition and sheet of the present invention, use of ratios of (A):(B) outside those set forth above are also effective. The range set forth above is merely exemplary.

Suitable solvents which generally can be used to dissolve the components (A) and (B) are organic solvents having a high degree of polarity, and they can be used either individually or as a mixture of two or more thereof. Suitable examples of solvents which can be used include N,N-dimethylformamide, N,N-dimethylacetamide, dimethyl sulfoxide, tetrahydrofuran, 1,4-dioxane, 1,3-dioxane, acetone, methyl ethyl ketone, methyl isobutyl ketone, cyclohexanone, tetrachloroethane, ethylene chloride, methylene chloride, chloroform, chlorobenzene, ethyl acetate, methanol, ethanol, isopropnaol, butanol, ethylene glycol-monomethyl ether, etc. Where homopolymers of vinyl pyridines are employed as the basic polymer (A) and copolymers of vinylidene chloride and acrylonitrile are employed as the halogen-containing polymer (B), a particularly preferred composition in the present invention, N,N-dimethylformamide is particularly preferred as a solvent. Further, a suitable mixture of N,N-dimethylformamide with the solvents described above can also be employed. The type of solvents and the mixing ratio thereof will vary widely depending upon the type of the two polymers (A) and (B), copolymerization ratio, mixing ratio of (A) and (B) and molecular weight, and therefore the type of solvents and mixing ratio is best determined by trial and error, which can be easily and routinely accomplished.

Suitable supports which can be used for the heat sensitive image recording sheet of the present invention are those supports to which the composition of this invention has good adhesion. A variety of sheet shapes, film shapes and plate shapes can be used as the support. Specific examples of suitable supports are films of polyethylene terephthalate, polyimides, nylons, polycarbonates, cellulose triacetate, etc., papers, synthetic papers, cloth, leather, synthetic leather, wood plates, glass plates, metal plates, etc. The thickness of the support can also optionally determined depending upon the purpose of use. In addition, where the sheet is employed for the purpose of mainly utilizing the electric conductivity induced by heating, an electrically conductive support is preferred. Suitable electrically conductive supports, for example, include the support materials described above having metals such as aluminum, chromium, etc., or semi-conductive materials such as tin oxide, indium oxide, etc., evaporated thereon, metal plates and further synthetic resin plates having metals plated or laminated thereon are preferably employed. Of these, support materials having a surface resistivity of less than about 10 K$\Omega$/cm$^2$ are preferred. A suitable thickness for the support is about 30 $\mu$m to about 1 mm, preferably 10 $\mu$m to 300 $\mu$m.

Coating of the solution of the basic polymer (A) and the halogen-containing polymer (B) on a support can be performed using a variety of methods well known to one skilled in the art. For example, rod coating, roller coating, curtain coating, dip coating, etc. can be used for coating. The concentration of the components (A) and (B) in the coating solution and the coating amount can be optionally chosen considering the method of heating, the heating temperature used, the heating time, the desired image density, the electric resistivity, etc., depending upon the purpose of use. However, in general, it is desirable for the dry thickness of the layer of the heat sensitive color forming and heat sensitive electrically conductivity increasing composition of this invention on the support to range from about 1 $\mu$m to about 1 mm.

The drying temperature and the drying time during the drying step after coating must be chosen so that color formation or the increase in electric conductivity is not induced during the drying. This will depend upon the kind of basic polymer (A) and halogen-containing polymer (B) used and the ratio thereof. In general, it is preferred for the drying to be carried out between about 15° and about 80° C., more preferably between 20° and 60° C. for a time period of about 0.5 to about 3 hrs.

The heat sensitive sheet of the present invention may also have a subbing layer or a top-coating protective layer, which layers may be electrically insulative when color formation only is the desired end result, but must have an electrical conductivity of less than the specific resistivity of the heated composition, e.g., less than about 10$^9$ $\Omega$ cm when electric conductivity is the desired end result.

The composition and heat sensitive image recording sheet in accordance with the present invention are stable at normal temperature (below 50° C.), and color is formed and electric conductivity is induced initially on heating. Accordingly, the composition of the present invention is a composition having a heat sensitive color forming property and a heat sensitive electric conductivity increasing property. In addition, images obtained by heating the heat sensitive image recording sheet of the present invention are colored images and at the same time are images which are electrically conductive.

While not desiring to be bound, it is believed that color formation which appears upon heating the composition or the sheet of the present invention is based upon formation of conjugated polyenes mainly by elimination of hydrogen halide from the halogen-containing polymer. However, it is also probable that the color formation could be partly or wholly based on a substance which is not a mere polyene, for example, a dye which constitutes a $\pi$-electron conjugated system as a whole which is formed with the result that the polyene further reacts with the basic groups in the basic polymer or with a quaternary salt formed by the reaction of the basic groups with hydrogen halide (for example, the cyanine dyes as proposed in H. Wechsler, *Journal of Polymer Science*, vol. 11, page 240 (1953)). In any event, it appears reasonable that the polyene moiety contributes at least to the color formation. Therefore, simply for brevity, the coloring species is merely referred to as a "polyene" in the description of the present invention.

Suitable heating means which can be employed can be varied depending upon the end use, however, in general, a hot plate, a heated medium (e.g., heated oil), a heated bar, irradiation with infrared light, irradiation with a laser beam, and the like can be utilized. When selective heating is applied to the composition of or to the sheet of the present invention, an image in the form of a color or an electrically conductive pattern can be obtained at the selectively heated portions.

The heating temperatures and the heating time periods can be varied widely depending upon the kind of composition (kinds of polymers making up the composition, ratios thereof, etc.), the thickness of the layer of the composition, and the further image density and electric conductivity desired, depending upon usage thereof. However, in general, suitable heating temperatures are about 100° to about 200° C., more preferably 120° to 170° C., and suitable heating times are about 5 secs to about 200 secs, more preferably 20 to 100 secs. Details are exaplained more specifically in the examples given hereinafter, but for example, where the thickness of the layer of the composition is 10 $\mu$m, heating at 150° C. for 100 seconds results in the formation of a black color and a transmission optical density of 1 to 2. The lower is the heating temperature and the shorter is the heating period of time, the closer to a brown color is the color formed and the lower is the optical density formed.

If the composition or sheet of the present invention is heated, color formation is induced on the one hand, and on the other hand, electric conductivity (which is recognized by a decrease in the resistivity of the composition or sheet) is imparted and such increases with the increase in heating temperature and heating time. This latter effect is believed to be due to either the quaternary salt formed by the reaction of the high molecular weight base and hydrogen halide or a polyene formed from the halogen-containing polymer, or both; however, it is not known which mainly contributes to the electric conductivity.

The electric resistivity of the composition in accordance with the present invention is about 10$^{12}$ $\Omega$ cm before heating and is electrically insulating; however, if the composition is heated, for example, at about 130° C. for 100 seconds, the resistivity decreases to about 10$^7$ to 10$^9$ $\Omega$ cm; or if heated at 150° C. for 100 seconds, the resistivity reaches about 10$^6$ to 10$^7$ $\Omega$ cm. This electric conductivity and substantial (visual) color formation are not necessarily induced simultaneously during heating. In general, the induction of electric conductivity proceeds at a lower temperature than substantial color formation. However, it is believed that both the induction of the electric conductivity and the formation of color are due to the reaction of eliminating hydrogen halide from the halogen-containing polymer; and any difference is merely due to difference in measurement sensitivity between methods for measuring the electric conductivity (electrical methods) and methods for measuring the color formed (optical methods using the naked eye, etc.). Accordingly, also in this case, although no visible image is formed, colored substances composed of polyenes are formed. However, it may be said that from a practical standpoint, only electric conductivity is achieved by selecting a heating temperature where substantial color formation does not occur.

The heat sensitive color forming and heat sensitive electrical conductivity increasing composition as well as heat sensitive image recording sheet in accordance with the present invention possess many excellent characteristics which are not possessed by conventional heat sensitive materials. Some of these characteristics are listed below.

(1) Black images having an extremely high optical density are obtained when heating is carried out sufficiently.

(2) The material before heating is uniform, colorless and transparent, and the colored material obtained on heating is also a transparent (non-light-scattering) image containing material.

(3) Images are mainly composed of polyenes and are extremely stable to external stimuli such as light, heat, moisture, etc. such that color fading does not occur.

(4) The unheated material is extremely stable at room temperature (below 50° C.) and can be stored for a long period of time without fog occurring. This is believed to be because the reaction inducing color formation and increase in electric conductivity due to heating is an interpolymer reaction, the temperature dependency thereof (or activation energy) is large and the reaction is substantially initiated only when heated at a definite temperature (for example, the glass transition point of the polymers), and the reaction rapidly proceeds at temperatures higher than that.

(5) Materials of the composition of the present invention are solely composed of polymers so that they are nontoxic.

(6) Preparation of the composition and sheet of the present invention is extremely simple.

(7) Since the materials are inexpensive and in view of characteristic (6) above, the composition and sheet can be produced at an extremely low cost.

(8) The composition and sheet of the present invention possess, in addition to the property of forming color on heating, a characteristic of becoming electrically conductive on heating which is a property not heretofore known and is a characteristic feature of the present invention. That is, by heating any desired portions of the material of the present invention, it is possible to convert the material in that portion from an electrically insulating material into an electrically conductive material.

(9) The electric conductivity which is first exhibited by heating the composition of the present invention is large as compared with that of known polymeric materials, and the specific resistivity reaches about $10^6$ $\Omega$ cm at a minimum. In addition, by selecting the heating temperature and the heating time, it is possible to control the electrical resistivity/conductivity between the value where the material is considered electrically insulative (about $10^{12}$ $\Omega$ cm) and the above mentioned minimum value where the material is considered electrically conductive.

(10) The increase in electrical conductivity due to heating is exhibited generally at a lower temperature prior to color formation. Therefore, by selecting the heating temperature, it is possible to achieve electric conductivity alone without any substantial color formation and hence substantially colorless electrically conductive images or uniformly conductive materials can be obtained.

(11) Additional writing-on (add on) the element of both colored images and electrically conductive images is possible.

The heat sensitive color forming and heat sensitive electrical conductivity increasing composition as well as the heat sensitive image recording sheet in accordance with the present invention are useful in an extremely wide variety of applications as listed below, including heat sensitive image recording, because of the many characteristics listed above.

Firstly, utilizing mainly the property of color formation on heating, the following applications are conceivable utilizing this property:

(1) Heat sensitive visible image recording elements:

If the heat sensitive image recording sheet of the present invention is heated, color images which are electrically conductive are obtained. By utilizing this color image forming capability, preferably to the ability to form visible images, the heat sensitive image recording sheet of this invention can be used for making copies, preparing slides, laser recording, etc. Image recording with the heat sensitive image recording sheet of this invention can be performed using a variety of conventional heating methods, for example, a method comprising bringing heated materials such as a heated stylus, a heated printing type, etc., into close contact with the recording materials; a method of heating comprising applying an electric current using a needle-like electrode; a method for irradiation with laser or electron beams; and a thermal copying method, which comprises contacting an original having a heat-absorbing pattern therein with the recording material and passing radiated heat homogeneously through the original, as described in Masanobu Wada, *Insha Kogaku II* (Printing Technology II), Chapter 5, Kyoritsu Shuppan, Co., Ltd. (1969), Tokyo, etc.

(2) Optical filters:

The composition of the present invention provides a uniform, transparent black-brown or black-color by coating the composition onto a transparent material (e.g., glass, synthetic resin, etc.) and then uniformly heating the coated transparent material. The optical density can be controlled, as desired, by choosing the heating temperature and heating time so that the material produced is suitable as an optical filter, particularly as a high-density neutral density filter. In addition, such a material produced as described above is useful as an eye protector for working (welding, etc.) and as sun glasses for general use.

(3) Films or papers for packing photographic materials, etc.:

The composition of the present invention on a support when colored and when rendered electrically conductive by heating has not only antistatic properties but also becomes a highly light shielding material.

(4) Materials for the graphic arts:

If the composition of the present invention is coated onto a support, a pattern can be produced by heating selected portions of the composition. That is, thermal printing is possible. Accordingly, the composition used in this manner is suitable for the production of decorative items, advertisements, post cards, etc. In particular, where a material to be printed has poor water proof properties e.g., a paper, etc., water resistance can be imparted by the use of the present invention, at the same time. In addition, because the colored materials obtained in accordance with the present invention are transparent, decorative items where the property of the surface (for example, metallic luster, etc.) on which the composition of this invention is coated is maintained can be produced, which is a characteristic a printing ink does not possess.

Next, considering the property of the composition of this invention to become electrically conductive on heating, the following applications are conceivable utilizing this property.

(5) When the heat sensitive image recording sheet of the present invention is heated, colored images which are electrically conductive are obtained. By utilizing mainly this electric conductivity, a variety of applications are possible. One example of an application of this type in which a marked effect is obtained is an element comprising an electrically conductive support (e.g., a metal plate, an electrically insulating material having a metal, etc., evaporated, laminated or plated thereon) having thereon the composition of the present invention. This element is imagewise heated, and the electrically conductive images thus formed are subjected to electrolytic plating using a solution containing metal ions such as copper ions, nickel ions, silver ions, etc., as an imagewise electrode so that metal images can be formed on the heated portions. Alternatively, if the electrically conductive images composed of polymers are electrostatically charged using a corona discharge, or the like, an electric discharge occurs at the heated portions (which are electrically conductive) and electric charges remain at the unheated portions so that if the element is then subjected to toner development, toner images are obtained. The toner development can be achieved by applying the methods as described in, for example, U.S. Pat. Nos. 2,221,776, 2,297,691, 2,618,551, 2,877,133 and British Pat. No. 658,699. Further, the toner image thus obtained can be transferred to paper, etc. The imagewise heating can be carried out in the same manner as described in (1) above.

(6) Electrically conductive coating solutions or antistatic coatings:

By coating the composition of the present invention onto a material followed by heating, the surface of the material can be rendered electrically conductive, and therefore, a solution of the composition of this invention can be used as an electrically conductive coating solution. (If the heating is not carried out over the entire surface but at selected portions thereof, the selected portions of the surface of the substance can be selectively rendered electrically conductive.) This is effective particularly as an antistatic coating, for example, for use as an inner lining for a container for flammable or explosive materials, etc.

As described above, the present invention provides a variety of extremely excellent characteristics, and utilizing these characteristics, a variety of useful articles can be prepared.

The present invention will be described in more detail with reference to the following examples thereof.

EXAMPLE 1

In 5 g of N,N-dimethylformamide were dissolved 0.6 g of poly-4-vinylpyridine (average molecular weight: about 100,000) synthesized by radical polymerization and 0.3 g of Saran F-220 (tradename, made by Asahi-Dow Co., Ltd.; copolymer of vinylidene chloride and acrylonitrile in a molar ratio of 4:1; average molecular weight, about 100,000) at room temperature (25° C.) to obtain a light yellow transparent solution. The resulting solution was coated onto a polyethylene terephthalate film (support) having a thickness of 100 μm using a coating rod. After drying at 30° C. for 2 hrs. while blowing air thereover, a colorless transparent sheet was obtained. The dry thickness of the polymer layer provided on the support was about 10 μm. The sheet so-obtained was brought into close contact with a hot plate heated at the temperature indicated in Table 1 below for 100 seconds, with the sheet being colored brown or black, having a transmission optical density (over all visible areas) thereof as indicated in Table 1 below.

Table 1

| Heating Temperature (°C.) | Transmission Optical Density | Color Tone |
| --- | --- | --- |
| 100 | 0.0 | Colorless |
| 130 | 0.1 | Brown |
| 150 | 1.0 | Black-brown |
| 170 | 1.9 | Black |
| 190 | 2.5 | Black |

COMPARISON EXAMPLE 1

Two kinds of solutions (A) and (B) as indicated below were prepared. The solutions were coated onto separate supports, respectively, followed by drying, in a manner similar to Example 1. Thus, colorless transparent films having a polymer layer with a dry thickness of about 10 μm on the supports were obtained.

| | |
| --- | --- |
| (A): Poly-4-vinylpyridine (as described in Example 1) | 1 g |
| N,N-Dimethylformamide | 5 g |
| (B): Saran F-220 | 1 g |
| N,N-Dimethylformamide | 5 g |

These films were brought into close contact with a hot plate for 100 seconds, at 150° C. and at 190° C., respectively. However, neither (A) nor (B) formed any color at either temperatures.

EXAMPLE 2

A sheet was prepared in a manner similar to Example 1 except that an electrically conductive film comprising a polyester film with an aluminum evaporation layer thereon ("Metalumi," tradename, made by Toray Industries, Inc.; surface resistivity, less than 10 Ω/cm$^2$) was employed as a support in place of the support (the polyethylene terephthalate film) of Example 1, and the coating composition was coated onto the aluminum evaporation layer in a manner similar to Example 1.

The sheet was brought into contact with a hot plate heated at the temperature recited in Table 2 below for 100 seconds.

Then, a platinum electrode (area: 1 cm$^2$) as an anode was brought into close contact with the polymer layer of the sheet, followed by applying a direct electric current voltage of 5 volts thereto using the aluminum evaporation layer as a cathode. The electrical resistivity was measured at room temperature. The relationship between heating temperature and specific resistivity is shown in Table 2 below. The sheet which was heated at temperatures above 130° C. was colored black-brown.

Table 2

| Heating Temperature (°C.) | Specific Resistivity (Ωcm) |
|---|---|
| No heating* | $7 \times 10^{11}$ |
| 100 | $2 \times 10^{11}$ |
| 130 | $1 \times 10^{8}$ |
| 150 | $1 \times 10^{7}$ |
| 170 | $3 \times 10^{6}$ |
| 190 | $1 \times 10^{6}$ |

*Allowed to stand at room temperature.

COMPARISON EXAMPLE 2

Sheets A and B were prepared by coating two kinds of solutions (A) and (B), respectively, onto the aluminum evaporation layer in a manner similar to Comparison Example 1 above except that a polyester film support having thereon an aluminum evaporation layer as described in Example 2 was employed as a support. The specific resistivity of the polymer coated layer of the sheets was $5 \times 10^{11}$ Ωcm. After heating the sheets on a hot plate at 150° C. and at 190° C., respectively, for 100 seconds, the specific resistivity thereof was measured in a manner similar to that in Example 2.

The specific resistivities remained at about $5 \times 10^{11}$ Ωcm with both Sheets A and B which were heated at 150° C. and at 190° C.

EXAMPLE 3

In 5 g of N,N-dimethylformamide were dissolved poly-4-vinylpyridine and Saran F-220 at room temperature (25° C.) in the weight ratio shown in Table 3 below, with the total amount being 1 g. Thus, homogenous light yellow transparent solutions were obtained. Sheets were prepared by coating onto a polyethylene terephthalate film of a thickness of 100 μm followed by drying, respectively, in a manner quite similar to that of Example 1. The dry thickness of the polymer layers provided on the supports was about 10 μm in each case. Then, these sheets were brought into close contact with a hot plate heated at 150° C. for 100 seconds, respectively, and thereafter, the transmission optical density (over all visible areas) was measured. The results obtained are shown in Table 3 below.

Table 3

| Poly-4-vinylpyridine/ Saran F-220 (weight ratio) | Optical Density | Color Tone |
|---|---|---|
| 8:1 | 0.3 | Brown |
| 4:1 | 0.7 | Black-brown |
| 2:1 | 1.0 | Black |
| 1:2 | 0.5 | Black-brown |
| 1:4 | 0.3 | Brown |
| 1:8 | 0.1 | Brown |

EXAMPLES 4 TO 12

In 5 g of N,N-dimethylformamide were dissolved 0.6 g of the high molecular weight base (A) as indicated in Table 4 below and 0.3 g of the halogen-containing high molecular weight material (B) indicated in Table 4 below. The resulting solutions were coated each in a dry thickness of 10 μm onto a polyethylene terephthalate support of a thickness of 100 μm followed by drying, respectively, in a manner similar to that in Example 1 to thereby prepare sheets. The sheets were brought into close contact with a hot plate heated at the temperature shown in Table 4 below for 60 secs to form brown to black colors. The transmission optical density (over all visible areas) of the colored sheets is also shown in Table 4 below.

Table 4

| Example | High Molecular Weight Base | Halogen Containing High Molecular Weight Material | Heating Temperature (°C.) | Optical Density |
|---|---|---|---|---|
| 4 | Poly(4-vinyl-pyridine-styrene) (copolymer, monomer molar ratio = ca. 1:1) | Saran F-220 | 150 | 0.8 |
| 5 | Poly(3-vinyl-pyridine) | " | 150 | 0.7 |
| 6 | Poly(2-methyl-5-vinylpyridine) | " | 150 | 0.6 |
| 7 | pyridine-acrylonitrile (copolymer: monomer molar ratio = ca. 1:1) | Poly(3-vinyl- " | 150 | 0.5 |
| 8 | Poly(4-vinyl-pyridene) | Poly(vinylidene chloride-acrylonitrile) (copolymer: monomer molar ratio= ca. 1:1) | 150 | 0.9 |
| 9 | Poly(4-vinyl-pyridine) | Poly(vinylidene chloride-styrene) (copolymer: monomer molar ratio=ca. 4:1) | 150 | 0.7 |
| 10 | Poly(4-vinyl pyridine) | Poly(vinylidene bromide-methyl methacrylate) (co- | | |

Table 4-continued

| Example | High Molecular Weight Base | Halogen Containing High Molecular Weight Material | Heating Temperature (°C.) | Optical Density |
|---------|---------------------------|---------------------------------------------------|---------------------------|-----------------|
|         |                           | polymer: monomer molar ratio=ca. 2:1              | 130                       | 0.9             |
| 11      | Poly(4-vinyl-pyridine)    | Polyvinyl Chloride                                | 180                       | 0.4             |
| 12      | Poly(4-vinyl-pyridine)    | Chlorinated Polyethylene (Cl content: 70 wt. %)   | 180                       | 0.5             |

EXAMPLE 13

Sheets were prepared in a similar manner to Examples 4, 5, 8 and 11 except that the supports were changed from the polyethylene terephthalate film to the polyester support with the aluminum evaporation layer thereon described in Example 2. All of the samples were brought into close contact with a hot plate heated at 150° C. for 60 secs. and then the specific resistivity thereof was measured in a manner similar to that in Example 2. The electrical resistivity thereof was $1 \times 10^7$, $5 \times 10^7$, $2 \times 10^7$ and $4 \times 10^8$ Ωcm, respectively. The sheets which were not heated all showed a specific resistivity of $5 \times 10^{11}$ Ωcm. In addition, all of the samples on heating were colored black-brown.

EXAMPLE 14

A sheet prepared as described in Example 1 was brought into close contact with a black plastic sheet, on which a mask prepared by imagewise etching of an aluminum evaporated polyester film (the image portions were transparent and the non-image portions were opaque because of the aluminum remaining) was further closely contacted, followed by exposing to light from an infra red lamp of 1 KW for 1 min. from a distance of 30 cm through the mask. As a result, brown images were recorded on the portions of the sheet corresponding to the transparent portions of the mask, and the non-image portions were scarecely colored.

EXAMPLE 15

Using a sheet prepared as described in Example 2, imagewise exposure was performed in a manner similar to that in Example 14 except that the exposure was performed for 20 secs. instead of an exposure for 1 min. As a result, very light brown images were slightly formed on the portions of the sheet corresponding to the transparent portions of the mask.

Then, a positive corona discharge was applied to the sheet and, after pouring a commercially available mixture of a carrier and toner for a Xerox 914 (tradename, manufactured by Xerox Corp.) thereon, the sheet was shaken several times in a horizontal direction. Thereafter, the sheet was slanted to remove the carrier. Toner images were formed on the portions of the sheet corresponding to the opaque portions of the mask. The toner images were transferred to obtain a good print in a positive-positive relationship to the mask.

While the invention has been described in detail and with reference to specific embodiments thereof, it will be apparent to one skilled in the art that various changes and modifications can be made therein without departing from the spirit and scope thereof.

What is claimed is:

1. A heat sensitive color forming and electrical conductivity increasing composition which comprises a mixture of
   (A) a basic polymer capable of reacting with hydrogen halide and capable of forming a quaternary salt, said basic polymer being obtained by polymerizing one or more addition polymerizable monomers containing a nitrogen-containing heterocyclic group or an aminophenyl group capable of being quaternized by reacting with hydrogen halide or by copolymerizing one or more of such addition polymerizable monomers with one or more other addition polymerizable monomers, said basic polymer having a number of basic groups as repeating units, and
   (B) a halogen-containing polymer capable of forming a conjugated polyene by elimination of hydrogen halide, said halogen-containing polymer being obtained by polymerizing one or more addition polymerizable monomers in which at least one halogen atom is substituted for a hydrogen atom bonded to a carbon atom forming an ethylenic unsaturated bond therein or copolymerizing one or more such monomers with one or more other addition polymerizable monomers or obtained by chlorination of a polymer which does not contain any chlorine.

2. The composition as claimed in claim 1, wherein said basic polymer (A) is a polymer of an addition polymerizable monomer containing a nitrogen-containing heterocyclic group or a monomer containing an aminophenyl group.

3. The composition as claimed in claim 2, wherein said nitrogen-containing heterocyclic group is bonded to a carbon atom of main chain of said polymer through an atom of said nitrogen-containing heterocyclic group other than a nitrogen atom of said nitrogen-containing heterocyclic group and said nitrogen-containing heterocyclic group is a pyridyl group, a quinolyl group, a piperidyl group, an imidazolyl group or a pyrimidyl group.

4. The composition as claimed in claim 2, wherein said monomer containing a nitrogen-containing heterocyclic group is unsubstituted or substituted with one or more of a straight chain or branched chain alkyl group having 1 to 7 carbon atoms.

5. The composition as claimed in claim 2, wherein said basic polymer (A) is a homopolymer containing as a repeating unit the repeating unit of at least one addition polymerizable monomer selected from the group consisting of compounds represented by the general formulae: (I) and (II):

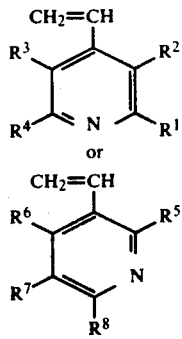

wherein $R^1$, $R^2$, $R^3$, $R^4$, $R^5$, $R^6$, $R^7$ and $R^8$, which may be the same or different, each represents a hydrogen atom, or a straight chain or branched alkyl group having 1 to 7 carbon atoms, or said basic polymer (A) is a copolymer containing as a repeating unit the repeating unit of at least one addition polymerizable monomer selected from the group consisting of compounds represented by the general formulae (I) and (II) in a mol fraction of at least about 0.3.

6. The composition as claimed in claim 2, wherein said basic polymer (A) is poly(4-vinylpyridine) or poly(3-vinylpyridine).

7. The composition as claimed in claim 1, wherein said halogen-containing polymer (B) is a homopolymer containing as a repeating unit the repeating unit of at least one monomer selected from the group consisting of vinylidene chloride and vinylidene bromide or a copolymer containing as a repeating unit the repeating unit of at least one monomer selected from the group consisiting of vinylidene chloride and vinylidene bromide in a molar fraction of at least about 0.3.

8. The composition as claimed in claim 7, wherein said halogen-containing polymer (B) is a copolymer of vinylidene chloride and acrylonitrile and the molar fraction of vinylidene chloride ranges of from 0.35 to 0.95.

9. The composition as claimed in claim 1, wherein said basic polymer (A) and said halogen-containing polymer (B) are present in a weight ratio of from about 8:1 to about 1:5.

10. A heat sensitive image recording sheet comprising a support having thereon a layer of the composition as claimed in claim 1.

11. The heat sensitive image recording sheet as claimed in claim 10, wherein said support is an electrically conductive support.

12. The composition as claimed in claim 1, wherein said halogen-containing polymer is obtained by the chlorination of polymer which does not contain any chlorine has a chlorine content of about 50 weight percent or more.

13. The composition as claimed in claim 12, wherein said halogen-containing polymer is selected from the group consisting of chlorinated polyethylene, chlorinated polypropylene and chlorinated rubbers.

* * * * *